US011097668B2

(12) United States Patent
Trebouet

(10) Patent No.: US 11,097,668 B2
(45) Date of Patent: Aug. 24, 2021

(54) DEVICE FOR CLEANING A DRIVER ASSISTANCE CAMERA OF A MOTOR VEHICLE

(71) Applicant: Valeo Systèmes d'Essuyage, Le Mesnil Saint Denis (FR)

(72) Inventor: Marcel Trebouet, Le Mesnil Saint Denis (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 42 days.

(21) Appl. No.: 15/543,702

(22) PCT Filed: Dec. 17, 2015

(86) PCT No.: PCT/EP2015/080331
§ 371 (c)(1),
(2) Date: Jul. 14, 2017

(87) PCT Pub. No.: WO2016/116231
PCT Pub. Date: Jul. 28, 2016

(65) Prior Publication Data
US 2018/0001837 A1    Jan. 4, 2018

(30) Foreign Application Priority Data

Jan. 22, 2015  (FR) ...................................... 1550513

(51) Int. Cl.
*B08B 3/02*    (2006.01)
*B60S 1/52*    (2006.01)
(Continued)

(52) U.S. Cl.
CPC ................ *B60R 11/04* (2013.01); *B08B 3/02* (2013.01); *B60R 19/48* (2013.01); *B60S 1/528* (2013.01);
(Continued)

(58) Field of Classification Search
CPC . B60R 11/04; B60R 19/48; B60R 2011/0094; B60R 2011/004;
(Continued)

(56) References Cited

U.S. PATENT DOCUMENTS 8,497,907 B2 *   7/2013   Barefoot .................. B60R 1/00
                                                    348/148
9,910,272 B2 *   3/2018   Witte ........................ B08B 3/04
(Continued)

FOREIGN PATENT DOCUMENTS

DE            10232227 A1    1/2004
DE     10 2008 008656 A1    8/2009
(Continued)

OTHER PUBLICATIONS

WO 2009101044, Machine Translation retrieved May 28, 2019. (Year: 2019).*
(Continued)

*Primary Examiner* — Nadine G Norton
*Assistant Examiner* — Christopher Remavege
(74) *Attorney, Agent, or Firm* — Osha Bergman Watanabe & Burton LLP

(57) ABSTRACT

A device for cleaning a camera lens (6), by means of a cleaning head, comprises a fixed cleaning head and a camera that is made mobile by means of drive means (10), the head being accommodated in a structural element (2) of the vehicle. The drive means are suitable for generating a relative movement of the camera in relation to the cleaning head, between a passive image capture position in which the camera is disposed accommodated in said structural element of the vehicle facing the cleaning head, and an active position in which the camera is deployed at a distance from the structural element of the vehicle to allow image capture.

(Continued)

The device is particularly effective when applied to the cleaning of a reversing camera implanted in motor vehicles.

18 Claims, 2 Drawing Sheets

(51) Int. Cl.
    *B60R 11/04*     (2006.01)
    *B60S 1/56*     (2006.01)
    *B60R 19/48*     (2006.01)
    *B60R 11/00*     (2006.01)

(52) U.S. Cl.
    CPC ........... *B60S 1/56* (2013.01); *B60R 2011/004* (2013.01); *B60R 2011/0092* (2013.01); *B60R 2011/0094* (2013.01)

(58) Field of Classification Search
    CPC .... B60R 2011/0092; B60S 1/56; B60S 1/528; B08B 3/02
    See application file for complete search history.

(56) References Cited

U.S. PATENT DOCUMENTS

| | | | | |
|---|---|---|---|---|
| 10,232,774 | B2* | 3/2019 | Trebouet | B60R 1/00 |
| 10,252,703 | B2* | 4/2019 | Ina | G02B 27/0006 |
| 2011/0073142 | A1* | 3/2011 | Hattori | B60S 1/56 |
| | | | | 134/56 R |
| 2011/0141281 | A1 | 6/2011 | Barefoot et al. | |
| 2015/0040953 | A1* | 2/2015 | Kikuta | B60S 1/52 |
| | | | | 134/123 |
| 2015/0078940 | A1* | 3/2015 | Kikuta | B60S 1/56 |
| | | | | 417/432 |
| 2015/0138357 | A1* | 5/2015 | Romack | H04N 7/185 |
| | | | | 348/148 |
| 2015/0329088 | A1* | 11/2015 | Krajisnik | B60R 1/00 |
| | | | | 134/18 |

FOREIGN PATENT DOCUMENTS

| | | | |
|---|---|---|---|
| JP | S58-140855 | U | 9/1983 |
| JP | S60-153062 | U | 10/1985 |
| JP | 2003-158649 | A | 5/2003 |
| KR | 10-2011-0059055 | A | 6/2011 |
| WO | 03/091069 | A1 | 11/2003 |
| WO | WO-2009101044 | A2 * | 8/2009 ............... B60R 1/00 |

OTHER PUBLICATIONS

International Search Report issued in PCT/EP2015/080331 dated Feb. 16, 2016 (2 pages).
Written Opinion of the International Searching Authority issued in PCT/EP2015/080331 dated Feb. 16, 2016 (6 pages).
Notification of Reasons for Refusal issued in corresponding Japanese Patent Application No. 2017-538711, dated Aug. 27, 2019 (12 pages).

\* cited by examiner

DEVICE FOR CLEANING A DRIVER ASSISTANCE CAMERA OF A MOTOR VEHICLE

The invention relates to the field of driver assistance and notably to video cameras installed on some vehicles. The invention relates more specifically to a device for cleaning a video camera of this kind to optimize the quality of the driving assistance information supplied to the driver.

Nowadays some motor vehicles are equipped with imaging means, and in particular with video cameras, to assist the driver during parking and/or reversing maneuvers in particular. Clearly the information supplied to the driver by such imaging means is all the more useful if the acquired image is sharp.

There are known cleaning devices that include a cleaning head mobile between a retracted position in which it is not in the field of view of the video camera and therefore does not impede imaging and an active cleaning position in which the head is deployed to face the video camera and to be able to spray cleaning liquid onto the lens of the video camera. See for example the documents DE 102008008656, US 2011/141281 or DE 10232227. In the latter document, the video camera is fixed and housed in a structural element of the vehicle so that the lens of the video camera is flush with the exterior face of the corresponding wall of the structural element. In an active cleaning position the cleaning head projects from the structural element and the sprayed cleaning liquid can splash passersby near the vehicle. Moreover, the cleaning head is small and fragile and is connected to a deployable structure and to hydraulic feed pipes. The mobile nature of this assembly weakens the cleaning head and entails the risk of the feed pipes breaking in the long term.

The present invention lies within this context and its objective is to propose a device for cleaning video cameras that is particularly effective and notably avoids the drawback described above. To this end, the invention consists in a device for cleaning a video camera lens of a motor vehicle by means of a cleaning head, in which the video camera and the cleaning head face each other in a position for cleaning the lens and are at a distance from each other in an active imaging position.

According to the invention, the device includes a fixed cleaning head sheltered by a structural element of the vehicle and a video camera that can be moved by driving means. The head is sheltered by a structural element of the vehicle and the driving means are adapted to generate movement of the video camera relative to the cleaning head between a passive position in which the video camera is sheltered by said structural element of the vehicle and faces the cleaning head to enable ejection of cleaning liquid toward the lens and an active imaging position in which the video camera is deployed at a distance from the structural element of the vehicle to enable imaging.

Note that the device according to the invention has a fixed cleaning head and a video camera that can be moved between an imaging position and a cleaning position. According to the invention it is particularly beneficial for it to be the video camera that moves and for the smaller and therefore more fragile cleaning head to be fixed. Moreover, the fact that the fragile cleaning head is fixed inside the structure makes it possible to protect this head and this further makes it possible to propose a cleaning position that is not in the open air, with the result that the spraying of cleaning liquid occurs inside the structure of the vehicle and cannot splash passersby with dirt or leave washing liquid residues on the external bodywork of the vehicle.

According to various features of the invention, separately or in combination:
the cleaning head includes means for connecting it to a cleaning liquid feed pipe and spraying means via which the liquid is able to exit said head in the direction of the lens in said active position of the video camera;
the cleaning head has a face with nozzles forming the spraying means, said head being arranged so that the nozzles are oriented toward a zone in which the video camera is able to adopt said passive position, and the lens faces toward the cleaning nozzles in this passive position;
the video camera is immobilized in rotation during the movement between the active imaging position and the passive position to orient the lens correctly, both to receive the cleaning liquid sprayed by the spray nozzles and to image the road scene correctly.

In accordance with a series of advantageous features, separately or in combination with one another and with the features described above, it is equally possible for:
the driving means to include a casing supporting the video camera, a rod fastened to the casing and an actuator adapted to move the rod in translation;
the casing to have a housing for the video camera such that the lens gives onto a face of the casing, a separate face of the casing serving as the face for connection to the rod;
the casing to include a cap extending the face of the casing opposite the face for connection to the rod substantially perpendicularly in at least one direction;
the casing to include means for guiding complementary longitudinal movement of the rod relative to the actuator.

According to another series of features, the actuator of the driving means of the video camera may be a hydraulic actuator. In this case, the actuator may include an enclosure forming a chamber in which can slide a piston constrained to move with the video camera by means of the rod that is connected at one end to the piston and that exits the enclosure via an orifice in a wall termed the proximal wall of the enclosure to be connected to the casing at the other end, the piston sliding because of the effect of the pressure of a liquid injected between an orifice in a wall termed the distal wall of the enclosure of the actuator, said piston being returned to its position by a spring housed in said chamber between the piston and the proximal wall. The liquid applying pressure to the piston and moving the video camera may be the cleaning liquid for cleaning the lens.

Also, the device may include control means adapted to generate instructions for controlling the cleaning head as a function of input data relating on the one hand to the position of the video camera and on the other hand to cyclic cleaning conditions. The instructions for controlling the cleaning head could equally be triggered if a soiling threshold being exceeded is detected by the video camera itself or by the user of the vehicle.

The invention also concerns a motor vehicle including a device for cleaning a video camera as has just been described hereinabove.

The cleaning device aims to move the video camera relative to the cleaning head and the latter is inside and fixed relative to the structure of the motor vehicle. The video camera is mobile between a passive position facing the cleaning head inside the structure of the vehicle and an active imaging position freed from the structure of the vehicle.

By a passive or active position is meant here a passive or active imaging position, it being understood that these positions respectively correspond to an active position and a passive position for cleaning the video camera.

In one preferred embodiment of the invention, the video camera adapted to be cleaned by said cleaning device is a reversing video camera at the rear of the vehicle oriented to image a road scene behind the vehicle. The invention therefore finds a particularly advantageous although not exclusive application in the field of assisting the parking of motor vehicles. The structural element inside which the cleaning head is housed is then a rear bumper. The invention more particularly concerns a motor vehicle in which the cleaning head is fixed inside the rear bumper and the video camera is adapted to adopt an active imaging position outside the bumper and a passive position inside the bumper, an opening being provided in said bumper to allow the video camera to move from one position to the other.

According to particular features of a vehicle of this kind, the rear bumper includes a substantially horizontal upper wall and a substantially vertical front wall and the opening for the video camera to pass through is in the upper wall. The video camera may be surmounted by a cap with dimensions substantially equal to those of the opening so as to cover said opening when the video camera is in the passive position. In this case, the edges delimiting the opening may include a surface for supporting the cap set back from the external face of the upper wall.

The invention finally concerns a method of cleaning a motor vehicle video camera in which said video camera is cleaned by ejection of liquid from a cleaning head and in which an instruction is first generated for moving the video camera from an active position in which the video camera is freed from the structure of the vehicle to perform imaging to a passive position in which the cleaning head faces the video camera inside the structure and secondly an instruction is generated for ejection of liquid by the cleaning head when at the same time the video camera is in said passive position and the cyclic conditions for triggering cleaning are complied with.

Other features and advantages of the present invention will become more clearly apparent in the light of the description and the figures, in which.

Figure 1:
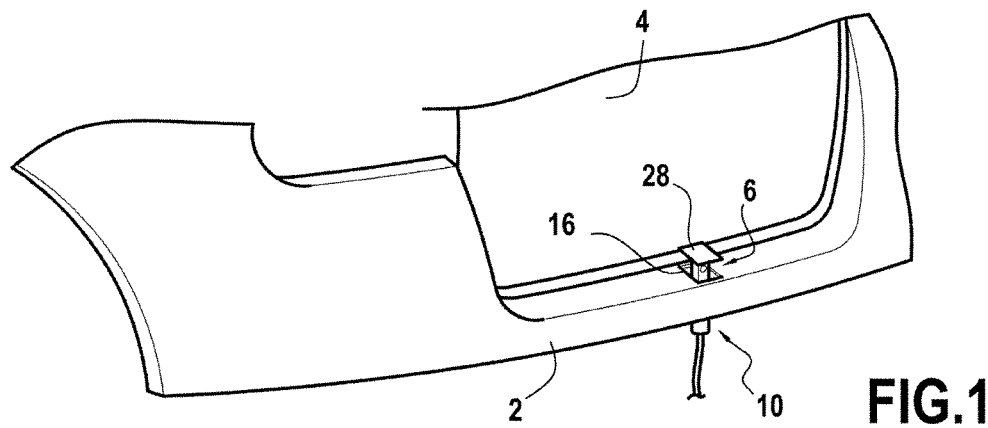
FIG. 1 is a three-quarter rear perspective view of a cleaning device according to the invention in a preferred application in a rear bumper, said device being in an active imaging position in which a video camera of the device is deployed outside the bumper to enable imaging.

A cleaning device 1 according to the invention is shown in the figures in its preferred application, namely in a reversing video camera system at the rear of a vehicle, in the vicinity of a rear bumper 2 disposed transversely and notably under a rear trunk lid 4, as can be seen in FIG. 1. The device notably includes a video camera 6 and a cleaning head 8 together with means 10 for driving movement in translation adapted to generate movement of the video camera relative to the cleaning head between an active imaging position (seen in FIG. 2) in which the camera is freed from the structure of the vehicle to produce images of the road scene situated behind the vehicle and a passive position (seen in FIGS. 3 and 4) in which the video camera is retracted into the structure of the vehicle and faces the cleaning head, which remains fixed in the same vehicle structure.

The video camera 6 forms means for imaging a road scene situated anywhere around the vehicle and advantageously behind the vehicle to provide information for the driver when reversing. In this case, the structural element is a rear bumper 2 that includes a substantially horizontal upper wall 12 disposed directly under the rear trunk lid and a substantially vertical front wall 14 that extends the upper wall downward.

Figure 2:
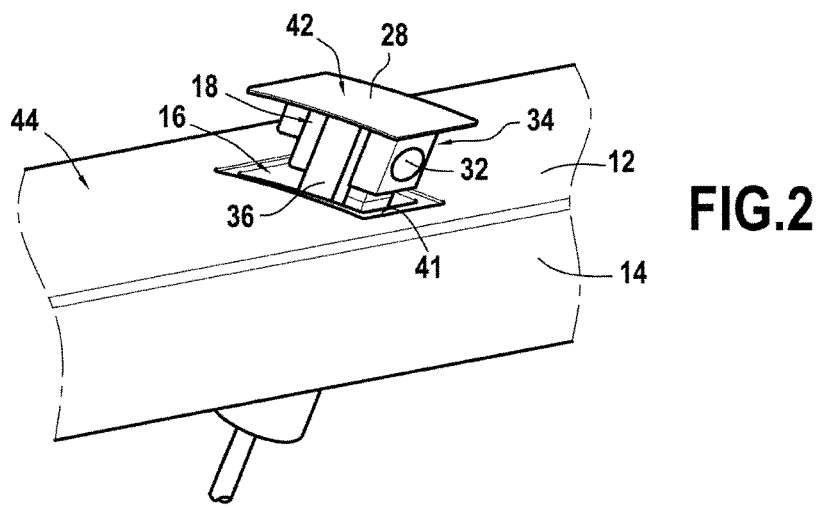
FIG. 2 is a detail view of the device from FIG. 1 showing in particular the video camera deployed outside the rear bumper of the vehicle.

An internal space is set back from the walls of the bumper to form a housing for said video camera and cleaning head and said driving means. In this context the bumper includes a communication opening 16 between the housing and the outside of the bumper so that the video camera can pass through this opening to adopt an active imaging position and then resume its passive position retracted into the bumper. In the situation shown in the figures and as can be seen in FIG. 2 in particular this opening 16 is cut into the upper wall of the bumper. The opening has a substantially rectangular shape the dimensions of which are significantly greater than the dimensions of a casing inside which the video camera is housed so as to allow the video camera to pass through the opening.

The casing 18 forms part of the means 10 for driving the video camera. It is mounted at the end of a rod 20 moved by an actuator 22 which with the rod and the casing forms said driving means. The casing is in the shape of a cube with a first face 24 connected to the rod and a second face opposite the first face and therefore the rod carrying a cap 28 extending the second face substantially perpendicularly in at least two directions. Moreover, the casing accommodates a video camera optical system 30 that includes a lens 32 opening onto a third face 34 of the casing that is perpendicular to the first and second faces and has to be cleaned at given intervals or after each use of the reversing video camera.

The casing also includes a guide lug 36 that consists in an increased thickness of a fourth face 38 of the casing and extends parallel to and at a distance from the rod 20. In the situation shown, the guide lug has a rectangular section, it being understood that it could be some other shape.

Figure 3:
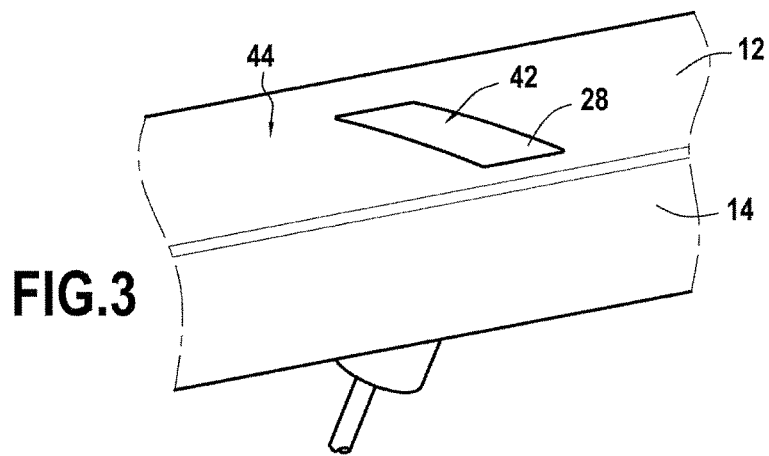
FIG. 3 is a detail view similar to that of FIG. 2 showing the device in a passive position with the video camera retracted into the structure of the vehicle.

In FIG. 3 the video camera is shown in the passive position, retracted inside the bumper, as seen from the outside of the vehicle. It can be seen that in this position the cap 28 closes the opening 16 in the bumper 2. It is beneficial for this cap to provide a watertight closure of the bumper so as to prevent rainwater in particular penetrating into the bumper. To this end, the cap having dimensions substantially equal to those of the opening, seals (not visible in the figures) are provided on the internal face 40 of the cap facing toward the bumper and there is formed in the upper wall of the bumper at the level of the edges delimiting this opening, all around the perimeter thereof, an extension of the edges toward the interior of the opening and set back from the exterior face of the upper wall to form a surface for supporting the cap so that in the passive position the external face 42 of the cap is flush with the external face 44 of the upper wall of the bumper.

The driving means 10 include the casing 18 in which the video camera is housed and the relative movement between the video camera and the cleaning head is therefore produced by the movement of the video camera. As described above, the driving means include, in addition to the casing, the rod 20 connected to the casing and the actuator 22.

The rod extends along a translation axis substantially perpendicular to the plane of the opening in the upper wall of the bumper so that the movement of the video camera through the opening is not impeded. The rod is fixed at a first end to the casing housing the video camera so as to be constrained to move with the video camera and at its second end to the actuator, which drives it in substantially vertical movement in translation. This generates corresponding vertical movement of the casing and the video camera.

The actuator of the translation driving means is adapted to drive movement in translation of the video camera away from and toward the retracted position in which the lens faces the cleaning head. A particularly advantageous embodiment is described hereinafter in which the driving means are hydraulic means.

In the situation shown, the actuator 22 includes an enclosure 46 forming a chamber in which a piston 48 fastened to the second end of the rod can slide by virtue of the effect of pressure differences created by the presence of a hydraulic fluid. It is clear that because of this pressure the piston is able to slide between first and second extreme positions, one corresponding to the retracted passive position of the video camera and the other corresponding to the active imaging position of the video camera.

The chamber is delimited by a hollow cylinder formed by a circular wall and delimited longitudinally by a first wall termed the proximal wall 50 facing toward the video camera and a second wall termed the distal wall 52. The proximal wall is pierced at its center to allow the passage of the rod that connects the casing housing the video camera to the piston of the actuator housed inside the chamber. Sealing means between this opening in the proximal wall and the rod prevent the liquid present in the chamber from leaking. The piston 48 is housed in the chamber and has a disk shape with dimensions complementary to those of the circular wall, being slightly less than the latter to allow it to slide in the chamber without liquid being able to flow between the piston and the circular wall.

A coil spring 54 is wound around the rod between the proximal wall 50 and the face of the piston facing toward that proximal wall. The spring is loaded so that it tends to push the piston toward the distal wall 52 when no fluid is exerting pressure on the piston.

A pipe 56 termed the fluid feed pipe of the chamber is connected to the chamber of the actuator at the level of an orifice 58 in the distal wall so that the fluid that is injected into this pipe is discharged into the chamber between the distal wall and the piston and pushes the piston toward the proximal wall. Clearly in the embodiment shown the fluid is evacuated via the same orifice as that used to feed it.

Figure 4:
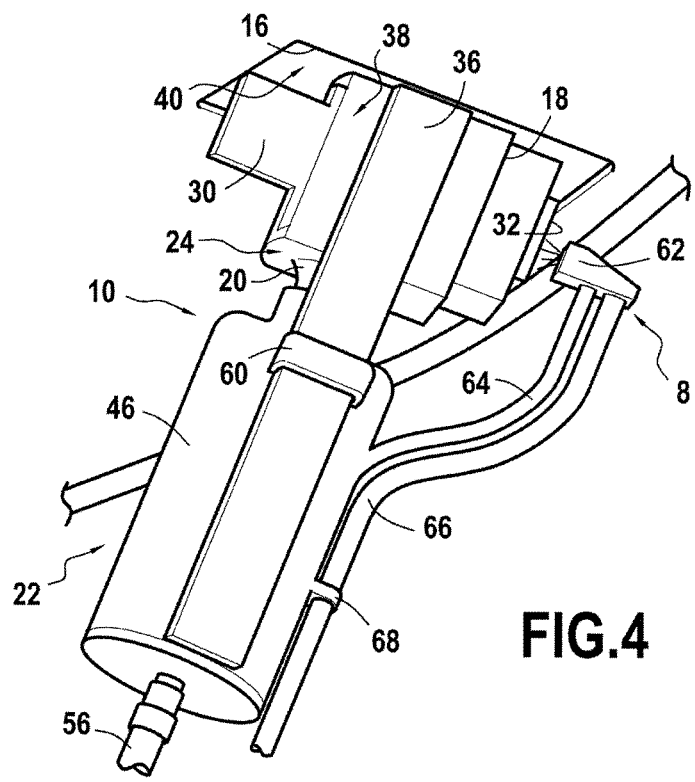
FIG. 4 is a view of the interior of the structure of the vehicle with the device in the passive position and showing the cleaning head and the associated liquid feed circuit together with the driving means of the video camera.

As can be seen in FIG. 4, the external surface of the enclosure of the actuator carries a loop 60 inside which the guide lug 36 fastened to the casing 18 can slide. The guiding of the casing and the video camera by both the rod and the guide lug ensures exclusively sliding movement of the casing relative to the actuator, preventing rotation of the casing on itself as it moves, with the result that the lens remains correctly oriented relative to the road scene for imaging and relative to the cleaning head.

Also shown in FIG. 4 is the cleaning head 8, which includes at least one cleaning liquid spray nozzle 62 facing toward the video camera when the latter is in the retracted position. As stated above, the cleaning head has a fixed position relative to the structure of the vehicle, housed inside the rear bumper when the application of the device is to clean a reversing video camera. The cleaning head is mounted at the end of a support arm 64 connected at its other end to the enclosure of the actuator 22 and the support arm extends on the one hand transversely away from the axis of movement of the video camera so as not to impede the latter and on the other hand vertically to dispose the head facing the lens of the video camera when the video camera is in the retracted position.

In a variant that is not shown the support arm is connected to a fixed point other than the enclosure of the actuator, and for example directly to the structure of the bumper. Clearly it is important for the cleaning head to remain in a fixed position during movement of the video camera, regardless of where it is fixed. Nevertheless, it should be noted that in the example shown the cumulative dimensions corresponding to the position of the liquid sprayer nozzles relative to the lens to be cleaned are reduced because of the fixing of the head directly to the enclosure of the actuator.

Moreover, a hydraulic feed pipe 66 is connected to the cleaning head to feed it with cleaning liquid. This feed pipe connects the cleaning head to a cleaning liquid tank situated elsewhere. The cleaning head includes an internal duct, not visible in the figures, for conveying the liquid leaving the feed pipe toward the sprayer nozzles. It could be advantageous to provide one and the same liquid tank for feeding the chamber of the actuator and for cleaning the lens on passing through the cleaning head. A control module determines when the liquid must be fed to the head and in what proportions. In particular, the control module will know how to establish an instruction to start operation of the cleaning head on the one hand when the video camera is in the position retracted into the rear bumper and on the other hand when the cyclic cleaning conditions are complied with. To limit the overall size of the device the feed pipe is here immobilized in a hook 68 fastened to the enclosure of the actuator 22 and is shaped to follow the curvature of the support arm.

Figure 5:
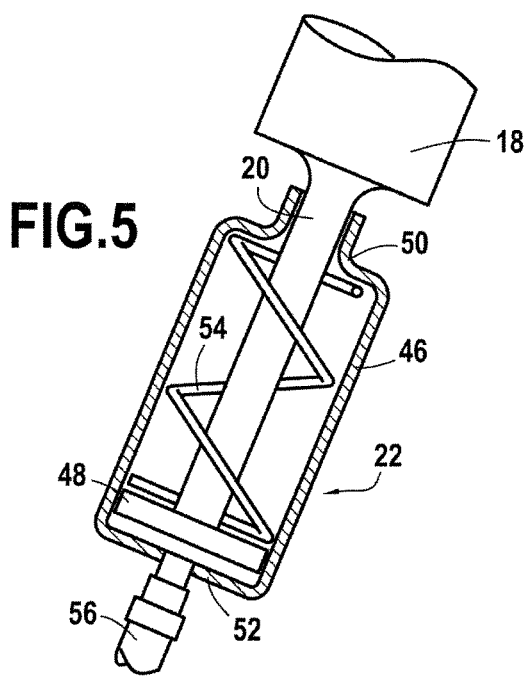
FIGS. 5 and 6 are sectional views of the driving means of the video camera in a first extreme position and a second extreme position, respectively.

The cleaning device of the invention is described first in a passive position, notably with reference to FIGS. 4 and 5. In that passive position the video camera and the cleaning head are housed inside the structure of the vehicle. The video camera has been moved to face the cleaning head, which has remained fixed inside the bumper, and it is then possible, by means of an appropriate control instruction, to clean the video camera.

In the absence of hydraulic fluid in the chamber of the actuator, the spring housed inside the chamber pushes the piston into a first extreme position in which the piston is closest to the distal end wall. In this first extreme position the piston is as far as possible away from the upper wall of the bumper through which the video camera can pass and the video camera, which is constrained to move with the piston by the rod and the casing, is therefore also set back relative to that upper wall, in a position such that the lens faces the spray nozzles of the cleaning head.

The passive position of the video camera, retracted into the structural element of the vehicle, is stable when the fluid injected into the chamber via the orifice in the distal wall does not generate sufficient pressure to cause the piston to move against the return force of the spring. Also it should be pointed out that this passive position does not automatically generate cleaning of the lens, for a number of reasons including the possibility that cleaning has been carried out previously without the video camera being activated in the meantime or the possibility that cleaning was carried out a number of cycles of movement of the video camera ago below the particular threshold number of cycles from which cleaning must be carried out.

Figure 6:
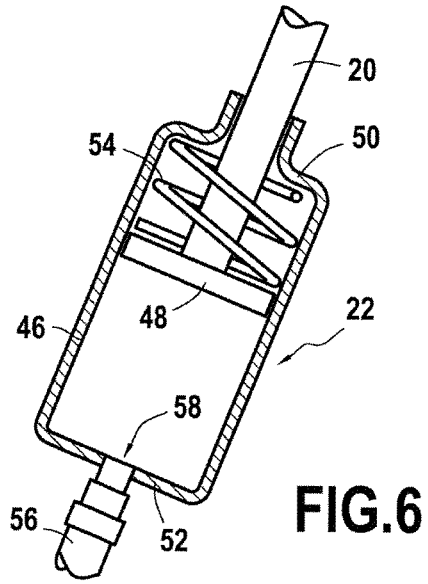

The operation of the cleaning device for the latter to go to an active position is described next, notably with the aid of FIG. 6.

When a situation is detected in which the reversing video camera will potentially be used, for example when the clutch is engaged, a control module causes the feeding of fluid into the chamber via the feed pipe. On filling the chamber the fluid creates a pressure on the piston and pushes the piston in the direction away from the distal wall. The longitudinal movement of the piston leads to the simultaneous movement of the video camera toward the outside of the structure of the vehicle, away from the cleaning head, which remains fixed.

The liquid pushes on the piston and compresses the spring, and the part of the chamber filling with liquid, between the proximal wall and the moving piston, continues to expand up to a particular position that corresponds to the active imaging position of the video camera. It is known how to determine the second extreme position, that is to say at what distance from the proximal wall the piston must be so that, depending on the length of the rod and the dimensions of the casing, the video camera is in the appropriate position for imaging without being too close and potentially impeded by the rear bumper and conversely without being too far out and overhanging. It is thereafter known how to determine the quantity of fluid to be injected into the chamber to reach this particular position of the piston, depending on the stiffness of the spring.

The piston is urged toward its initial position and when imaging has been effected the control module generates an instruction to cut off the feed of fluid to the chamber so that the piston is pushed back against the distal wall, ejecting the fluid out of the chamber via the orifice in the direction opposite the feed direction. The return movement of the piston toward the distal wall generates simultaneous movement of the video camera toward the interior of the structural element, and when the piston is in the first extreme position, substantially against the distal wall, the lens of the video camera is facing the cleaning head. The control module can then generate an instruction to feed cleaning liquid to the cleaning head. When the video camera is in the passive position, that is to say when it is retracted into the structure and faces the cleaning head, the cleaning operation need not be systematic, notably to economize on cleaning liquid. Cleaning could advantageously be commanded on the twofold condition of presence of the video camera in the passive position and a predefined cleaning period ending.

The foregoing description explains clearly how the invention makes it possible to achieve the objectives set for it and notably to propose a cleaning device in which the relative mobility between a video camera and an associated cleaning head is produced by the mobility of the video camera and a fixed position of the cleaning head and in which the zone in which the video camera is cleaned is sheltered by a structural element to prevent splashing outside the vehicle.

Of course, a person skilled in the art is able to make diverse modifications to the structures of the cleaning device that have just been described by way of nonlimiting example provided that they allow relative movement of an imaging video camera for assisting driving a vehicle relative to a cleaning head from a passive position in which the cleaning head and the video camera are close together to enable a cleaning operation to an active position in which they are separated from each other with the cleaning head remaining sheltered by the structure of the vehicle and the video camera deployed outside the structure of the vehicle for a reduced time period corresponding to the imaging period. The embodiment that has been described in detail above is not limiting on the invention. In any event, the invention should not be limited to the embodiment specifically described in this document and in particular encompasses any equivalent means and any technically operative combination of those means.

Thus variants that have not been shown can be foreseen and some are described below, without this list being exhaustive:

the driving means may include a hydraulic or electric actuator for moving the video camera in translation;

the conditions triggering cleaning of the lens of the video camera could be different from those described above and notably such that the liquid is fed to the cleaning head simultaneously with cleaning the rear window of the vehicle.

The invention claimed is:

1. A device for cleaning a lens of a driving assistance video camera, the device comprising:

a fixed cleaning head; and a video camera that is moved by driving means, the head being housed in a structural element of a motor vehicle and the driving means being configured to generate a movement of the video camera relative to the cleaning head between a passive position and an active position, wherein the video camera is immobilized in rotation during the movement in translation between the active position and the passive position to orient the lens, and wherein the video camera and the cleaning head share a same axis in the passive position of the video camera, the axis being orthogonal to a translational axis of the video camera such that the video camera faces towards the cleaning head in a direction that is orthogonal to a direction of the movement of the video camera.

2. The cleaning device as claimed in claim 1, wherein the cleaning head includes means for connecting it to a cleaning liquid feed pipe and spraying means via which the liquid is able to exit said head in the direction of the lens in said passive position of the video camera.

3. The cleaning device as claimed in claim 2, wherein the cleaning head has a face with nozzles forming the spraying means, said head being arranged so that the nozzles are oriented toward a zone in which the video camera is able to adopt said passive position.

4. The cleaning device as claimed in claim 1, wherein the driving means include a casing supporting the video camera, a rod fastened to the casing and an actuator configured to move the rod in translation.

5. The cleaning device as claimed in claim 4, wherein the casing has a housing for the video camera, wherein the lens is disposed on a face of the casing, and wherein another face of the casing is connected to the rod.

6. The cleaning device as claimed in claim 5, wherein the casing includes a cap extending substantially perpendicularly in at least one direction the face of the casing opposite the face for connection to the rod.

7. The cleaning device as claimed in claim 5, wherein the casing includes means for guiding complementary longitudinal movement of the rod relative to the actuator.

8. The cleaning device as claimed in claim 4, wherein the actuator of the driving means of the video camera is a hydraulic actuator.

9. The cleaning device as claimed in claim 8, wherein the actuator includes an enclosure forming a chamber in which can slide a piston constrained to move with the video camera by means of the rod that is connected at one end to the piston and that exits the enclosure via an orifice in a wall termed the proximal wall of the enclosure to be connected to the casing at the other end, the piston sliding because of the pressure of a liquid injected into an orifice in a wall termed the distal wall of the enclosure of the actuator, said piston being urged into position by a spring housed in said chamber between the piston and the proximal wall.

10. The cleaning device as claimed in claim 9, wherein the liquid applying pressure to the piston and moving the video camera is the cleaning liquid used for cleaning the lens.

11. The cleaning device as claimed in claim 1, wherein control means are adapted to generate instructions for controlling the cleaning head as a function of input data relating on the one hand to the position of the video camera and on the other hand to cyclic cleaning conditions.

12. The motor vehicle including the cleaning device as claimed in claim 1, in which the cleaning head is fixed relative to the structure of the motor vehicle, inside the latter, and in which the video camera is mobile between the passive position, retracted inside the structure of the motor vehicle so as to face the cleaning head, and the active position, in which the video camera is deployed outside the structure.

13. The motor vehicle as claimed in claim 12, wherein the video camera adapted to be cleaned by said cleaning device is a reversing video camera at the rear of the motor vehicle and oriented to image a road scene behind the motor vehicle, the cleaning head being fixed inside the rear bumper and the video camera being adapted to adopt active position outside the bumper and the passive position inside the bumper, an opening being provided in said bumper to allow the video camera to move from one position to the other.

14. The motor vehicle as claimed in claim 13, wherein the rear bumper includes a substantially horizontal upper wall and a substantially vertical front wall, the opening for the video camera to pass through being in said upper wall.

15. The motor vehicle as claimed in claim 14, wherein the video camera is surmounted by a cap with dimensions substantially equal to those of the opening so as to cover said opening when the video camera is in the passive position.

16. The motor vehicle as claimed in claim 15, wherein the edges delimiting the opening include a surface for supporting the cap set back from the external face of the upper wall.

17. A method of cleaning a lens of a driving assistance video camera via a device comprising a fixed cleaning head and a video camera that is moved by driving means, the head being housed in a structural element of a motor vehicle and the driving means being configured to generate a movement of the video camera relative to the cleaning head between a passive position and an active position, the method comprising:
  generating instructions for interchangeably moving the video camera depending on input data from the passive position in which the video camera is retracted into the structure of the motor vehicle and the active position in which the video camera is deployed; and
  generating an instruction for ejection of liquid by the cleaning head when at the same time the video camera is in said passive position and cyclic conditions for triggering cleaning are complied with, and
  wherein the video camera is immobilized in rotation during the movement in translation between the active position and the passive position to orient the lens, and
  wherein the video camera and the cleaning head share a same axis in the passive position of the video camera, the axis being orthogonal to a translational axis of the video camera such that the video camera faces towards the cleaning head in a direction that is orthogonal to a direction of the movement of the video camera.

18. A device for cleaning a lens of a driving assistance video camera of a motor vehicle by a cleaning head, in which the video camera and the cleaning head are at a distance from each other in an active position, the device comprising:
  a fixed cleaning head; and
  a video camera that is moved by driving means,
  the head being housed in a structural element of the motor vehicle and the driving means being configured to generate a movement of the video camera relative to the cleaning head between a passive position in which the video camera is housed in said structural element of the motor vehicle facing the cleaning head and the active position in which the video camera is deployed at a distance from the structural element of the motor vehicle to enable imaging, and
  wherein the video camera is immobilized in rotation during the movement in translation between the active position and the passive position to orient the lens,
  wherein the video camera and the cleaning head face towards one other in the passive position, and
  wherein the video camera and the cleaning head share a same axis in the passive position of the video camera, the axis being orthogonal to a translational axis of the video camera such that the video camera faces towards the cleaning head in a direction that is orthogonal to a direction of the movement of the video camera.

* * * * *